United States Patent [19]

Pelgrim et al.

[11] Patent Number: 5,172,673

[45] Date of Patent: Dec. 22, 1992

[54] INJECTION INTERNAL COMBUSTION ENGINE WITH ELECTRICAL SPARK IGNITION

[75] Inventors: Robertus J. Pelgrim, EB Borne; Cornelis P. Hulshof, CP Apeldoorn; Arie Van Der Ploeg, VA Wierden, all of Netherlands

[73] Assignee: Texas Instruments Incorporated, Dallas, Tex.

[21] Appl. No.: 686,331

[22] Filed: Apr. 16, 1991

[30] Foreign Application Priority Data

Apr. 17, 1990 [NL] Netherlands ................... 9000910

[51] Int. Cl.$^5$ ............................................. F02M 31/00
[52] U.S. Cl. ..................................... 123/549; 123/543; 123/547
[58] Field of Search ............... 123/549, 543, 547, 557, 123/552, 555, 545

[56] References Cited

U.S. PATENT DOCUMENTS

| | | | |
|---|---|---|---|
| 4,347,826 | 9/1982 | Nomura et al. | 123/549 |
| 4,378,001 | 3/1983 | Takeda et al. | 123/445 |
| 4,395,993 | 8/1983 | Tanaka et al. | 123/549 |
| 4,395,994 | 8/1983 | Goto et al. | 123/549 |
| 4,416,242 | 11/1983 | Kato et al. | 123/549 |
| 4,489,232 | 12/1984 | Wada et al. | 123/549 |
| 4,628,889 | 12/1986 | Van Der Ploeg | 123/552 |
| 4,967,706 | 11/1990 | Van Wechem et al. | 123/549 |

FOREIGN PATENT DOCUMENTS

| | | |
|---|---|---|
| 0061848 | 6/1982 | European Pat. Off. . |
| 0248503 | 9/1987 | European Pat. Off. . |
| 08801334 | 12/1989 | Netherlands . |

Primary Examiner—Andrew M. Dolinar
Assistant Examiner—M. Macy
Attorney, Agent, or Firm—Russell E. Baumann; Rene' E. Grossman; Richard L. Donaldson

[57] ABSTRACT

An internal combustion engine having a fuel injection furnishing fuel to a cylinder via a cylinder head passage leading to a cylinder inlet valve and having an air inlet channel member furnishing air to the cylinder via the passage has a heating element having a heat sink and a PTC heating tablet on the heat sink recessed into an opening in the cylinder head or the air inlet channel to receive fuel from the fuel injector and facilitate mixing of the fuel and air being furnished to the cylinder substantially free of interference with the flow of the air to the cylinder.

13 Claims, 3 Drawing Sheets

INJECTION INTERNAL COMBUSTION ENGINE WITH ELECTRICAL SPARK IGNITION

BACKGROUND OF THE INVENTION

The field of the invention is that of heaters for fuel being furnished to an internal combustion engine cylinder and the invention relates, more particularly, to heating of fuel furnished to a cylinder by a fuel injector to facilitate mixing of the fuel with air being supplied to the cylinder.

The invention relates to an injection internal combustion engine with electric spark ignition, comprising at least one cylinder provided with an air inlet channel, at least one inlet valve fitted in the cylinder head, at least one fuel injector with a heating element with heat sink fitted downstream of said injector, and at least one PTC wafer provided thereon.

Such an internal combustion engine is known from German Patent No. 3,426,469-C2 and U.S. Pat. No. 4,967,706.

It has been found that approximately 50% of the total exhaust gas pollutant emission is formed in the short period during which the engine has not yet reached its operating temperature. Even exhaust gas catalytic converters, which in normal circumstances reduce the exhaust gas pollution emission by approximately 90% reach this degree of conversion only when the operating temperature of the catalytic converter has been reached. The conversion begins at a temperature of approximately 300° C., so that for a significant time after a cold start there is little or no reduction at all in the exhaust gas pollution emission of the engine in a catalytic converter. Since the temperature level is not high enough to vaporize all of the gasoline or alcohol, fuel, an additional or extra quantity of fuel has to be added when the engine is cold in order to obtain a desired combustible air-fuel mixture ratio. This leads to a high exhaust gas pollution emission. At low engine temperature both the fuel consumption and the exhaust gas pollution emission are therefore relatively high. Heating the fuel/air mixture therefore makes a considerable contribution to the improvement of the environment and also achieves a considerable fuel saving, by permitting less fuel (or no additional or extra fuel) to be injected. The fuel in the internal combustion engine mentioned above is preferably sprayed onto a heating element, which heating element is brought to the desired temperature in a short time, and is therefore adapted to bring the fuel to a desired temperature in the process. The fuel will thereby vaporize better and better mixing with the combustion air is also achieved. The heating element is preferably switched off when the engine is hot enough to take over the vaporization of the fuel.

In the case of the engine known from the above mentioned German Patent 3426469-C2 the heating element is designed in the form of a pipe projecting into the inlet channel of the cylinder and surrounded by an insulating tube. The pipe and the tube are provided with an end flange lying in a recess of the cylinder head and fixed in alignment with air flow through the air inlet pipe. A disadvantage of this engine is that fitting and replacement of the heating element is a time-consuming job. The same objection applies to the engine according to the above-noted U.S. patent wherein the heating element is integrated in a plate wedged between the inlet channel and the cylinder head. Those known engines also have a tendency to provide a reduced air inlet cross-section.

BRIEF SUMMARY OF THE INVENTION

The object of the invention is to avoid this disadvantage and to provide a heating element of the type mentioned above in which the heating element is easy to fit and replace, and where in the case of a multi-cylinder engine the heating elements can be replaced cylinder by cylinder if replacement is required.

According to the invention, the internal combustion engine mentioned in the preamble is to this end characterized in that the heating element is fitted in or recessed into an opening in the wall of the cylinder head or of the air inlet channel.

An additional advantage is that the heating element can be added to existing engine designs and the number of cylinders does not matter.

It is important that the heating element can be fitted easily in the opening in the wall of the cylinder head or of the air inlet channel and that it can be assembled easily from parts in an automated process. In connection herewith, it is preferable for the heating element to have a plastic contact carrier, while a spring connected to an electric connecting element is fitted between the PTC wafer and the contact carrier, and the heat sink has at least two pins, each of which projects through an opening in a metal leaf spring with parts bent away from the contact carrier and through an opening in a U-shaped fixing bracket, which bracket falls round the contact carrier and round the above-mentioned leaf spring, and in which the heating device is retained in the opening in the wall of the cylinder head or of the air inlet channel by a circlip or annular retaining ring projecting into a groove in said wall, which circlip presses in bent leaf spring parts or the like against spring action to press the contact carrier against a shoulder in the opening.

The invention also relates to a cylinder head or an air inlet intended for an internal combustion engine in which an opening is made in the wall thereof for the accommodation of a heating element.

Since the heating element forms part of the cylinder head or the inlet channel, it can be fitted in the wall of the cylinder head or the inlet channel before the head or said channel is mounted in the engine. This makes the heating element simple and cheap to fit. Preferably the heating element opening is separated from the junction between the air inlet member and the cylinder head to facilitate cylinder head sealing.

Finally, the invention relates to a heating element for heating of the fuel/air mixture for an Otto internal combustion engine of the injection type, comprising a plastic contact carrier, a heat sink and at least one PTC wafer fitted on the heat sink, while a metal spring connected to an electric connecting element is fitted between wafer and contact carrier, and the heat sink has at least two pins, each of which projects through an opening in a metal leaf spring with parts bent away from the contact carrier and through an opening in a U-shaped fixing bracket, which brackets fall round the contact carrier and round the above-mentioned leaf spring.

DESCRIPTION OF THE DRAWINGS

The invention will now be explained in greater detail with reference to the figures.

DESCRIPTION OF THE PREFERRED EMBODIMENTS

Figure 1:
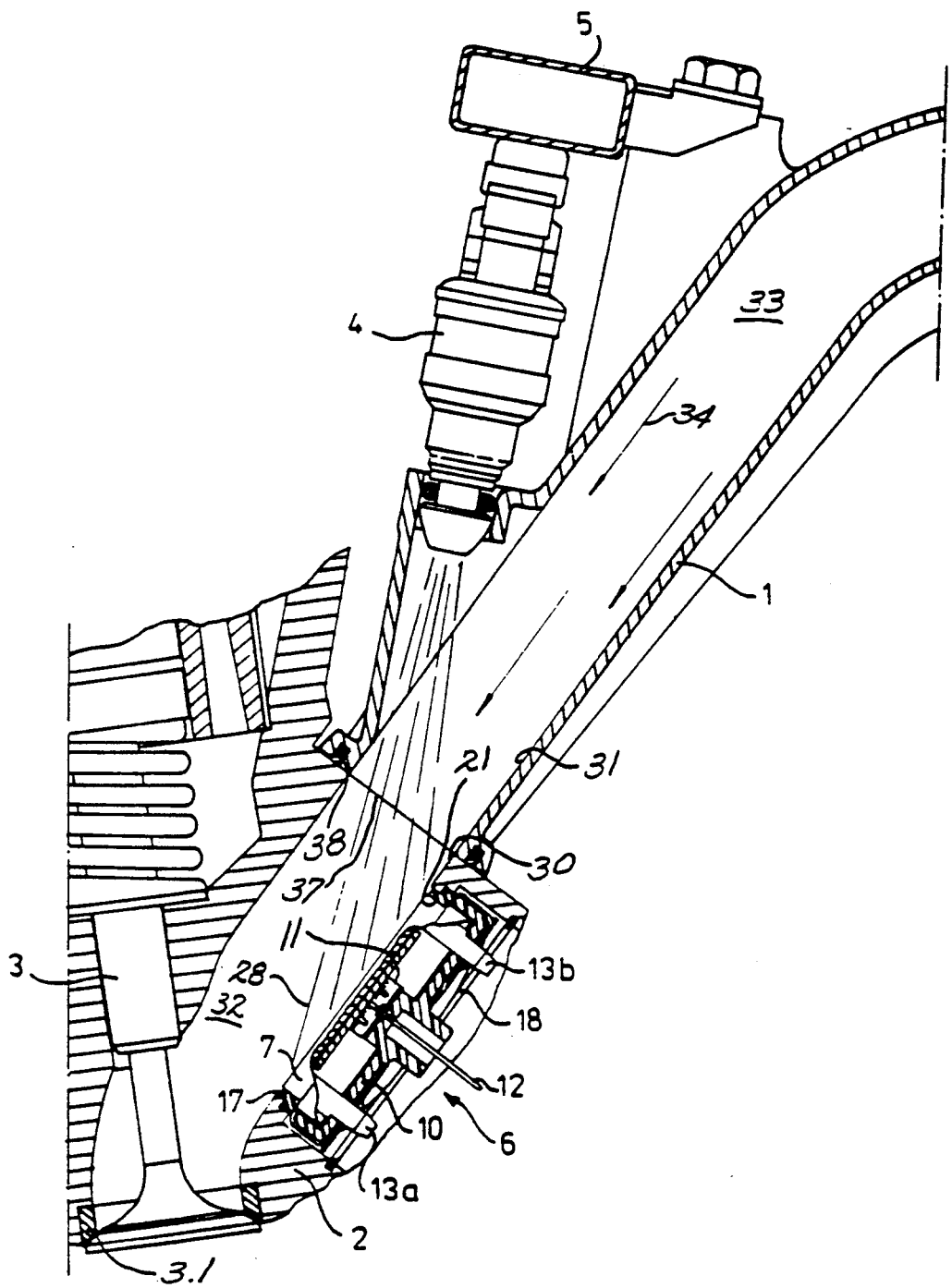
FIG. 1 shows a cross-section of a part of an internal combustion engine according to the invention in which a heating element is fitted in an opening in the cylinder head.
Figure 2:
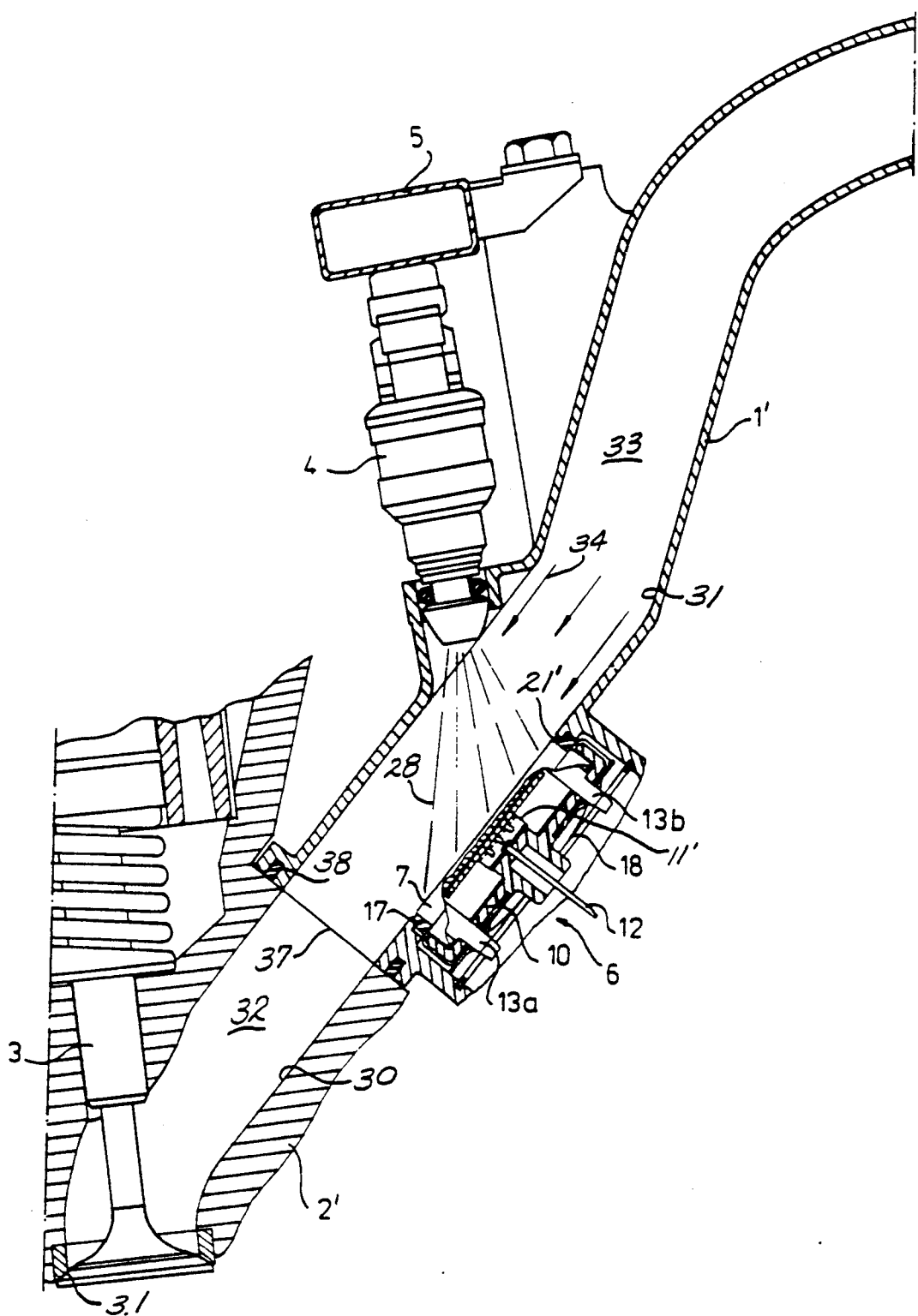
FIG. 2 shows a cross-section of a part of an internal combustion engine in which a heating element is fitted in an opening in the air inlet pipe.
Figure 3:
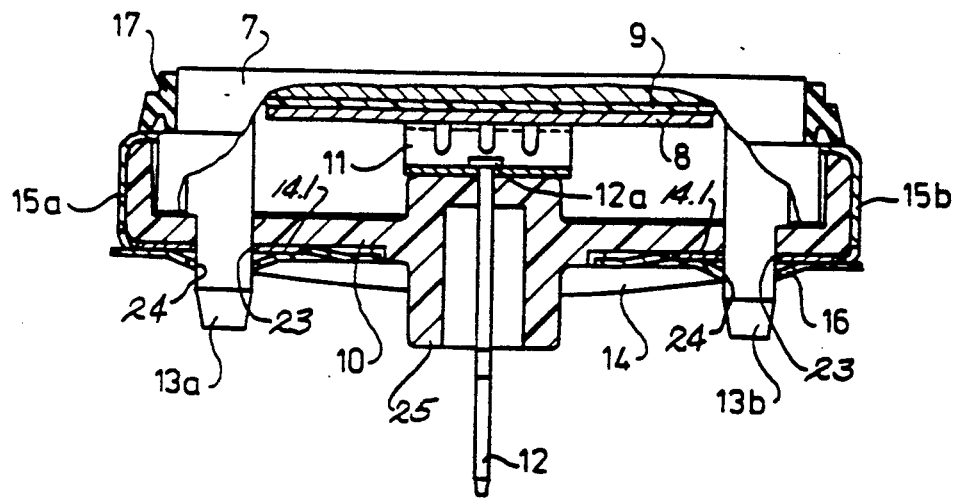
FIG. 3 shows a cross-section through a heating device according to the invention.

Each of the embodiments shown in FIGS. 1 and 2 relates to an injection engine with electric spark ignition having at least one and usually a plurality of engine cylinders in which an air inlet channel 1 is fixed on a cylinder head 2 near a cylinder inlet valve 3 for each cylinder for furnishing air 34 to the cylinder through a cylinder valve opening 3.1. A fuel injector 4 of a generally conventional type for injecting fuel 28 is fixed on the channel member 1 and is connected to a fuel supply 5.

In order to bring the fuel to the desired temperature when the engine is cold, the fuel is sprayed during injection onto a heating element 6, which as shown in FIG. 1 is fitted in or recessed into an opening 21 in the wall of the cylinder head 2 and in FIG. 2, in which corresponding components are identified with corresponding reference numerals, is fitted in an opening 21 in the wall of the air inlet channel 1'. Preferably as shown the openings 21 and 21' extend through the head or member and the heating element is recessed into the opening 21 or 21' so that the heat sink is flush with a wall 30 or 31 of the cylinder head passage 32 or the air inlet member channel 33 to permit the air 34 to flow to the cylinder substantially free of interference with the air flow.

The heating element has a heat sink 7 on which a thermistor wafer 8 such as a tablet of ceramic material with a positive temperature coefficient (PTC material) is disposed. Preferably the tablet is bonded to the heat sink by means of a heat and electricity conducting adhesive 9. A contact carrier 10 made of insulating plastic and in the form of a round cup-shaped member or dish serves as the support for a metal leaf spring 11 which acts on the wafer 8 and is connected to an electric connecting lip or terminal 12 leading through the contact carrier. One end of said terminal is deformed to form a fixing head 12a for attaching the terminal to the spring.

The heat sink has two pins 13a, 13b, each projecting through an opening 22 in the contact carrier 10, an opening 23 in a leaf spring 14 to be described in further detail, and an opening 24 in one of two fixing brackets 15a, 15b. The leaf spring 14 has two parts 14a, 14b bent away from the contact carrier. Each of the U-shaped brackets 15a, 15b grips around the contact carrier and presses an apertured flat part 14.1 of the leaf spring 14 against the contact carrier. An aperture (not shown) in the leaf spring fits over a central boss part 25 of the contact carrier. Slanting lips or detent spring parts 16 of the brackets 15a, 15b and engaged in a clamping manner on one of the pins 13a, 13b of the heat sink fitted around the opening 24 in the brackets 15a, 15b. A shaped sealing ring or O-ring gasket or the like 17 is provided around the heat sink 7 for sealing the heating element 6 in the opening 21 or 21' in the cylinder head or air inlet member.

In order to fix the heating element in an opening 21 or 21' in the wall of the cylinder head 2 or of an air inlet channel 1', a metal circlip or split annular retaining ring of conventional type 18 is placed in a groove 26 in the wall 27 of said opening while the leaf spring parts 14a, 14b are compressed, the sealing ring 17 being pressed by the heating element into a shoulder or shaped wall part 20 of the cylinder head or inlet member opening, the edge of the contact carrier itself being pushed against a shoulder 19 in the wall of the head or member opening.

A major advantage of the design of the heating element described is that all parts thereof are easy to assemble and can be fixed to each other without the use of screws, nuts and the like. Another advantage is the simple fitting of the heating element in its mounting opening by means of the circlip 18, where the leaves 14a, 14b of the leaf spring cause a suitable compression or deformation of the sealing ring 17 and pressing of the contact carrier against the shoulder 19.

Figure 4:
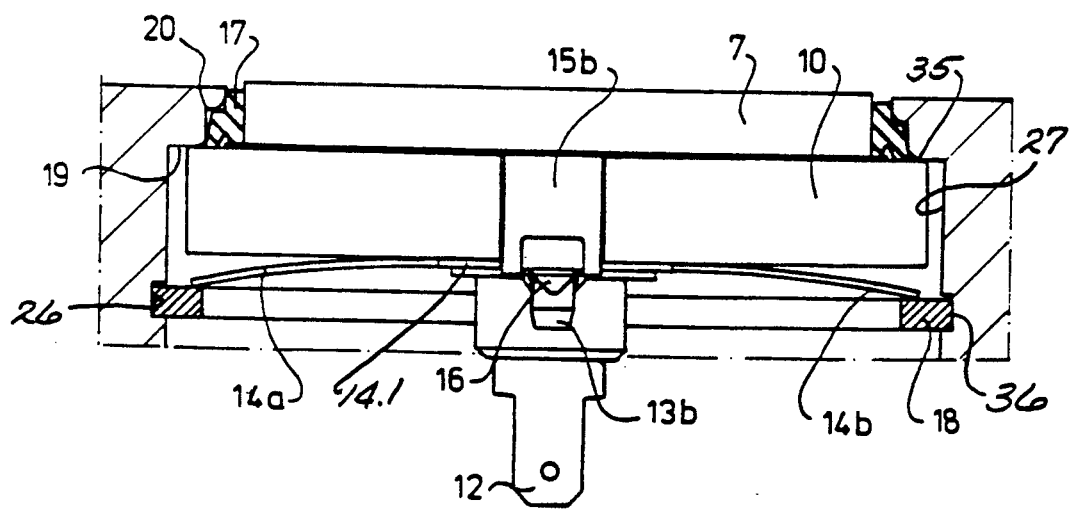
FIG. 4 shows a view of said heating element viewed in the direction of the arrow in FIG. 3.

By connecting the contact or terminal 12 to an automotive power source (battery, e.g.), electric voltage is applied over the PTC wafer 8 and heat is generated and transmitted via the heat sink to the fuel 28 sprayed onto it. At a certain temperature the electrical resistance of the wafers has increased to such an extent that the temperature does not rise any further due to the PTC character of the tablet 8. An earth or ground connection must be provided between the heat sink 7 and the wall of the cylinder head 2 or the inlet channel 1' as indicated at 35 or 36 in FIG. 4 e.g. The current runs for example from the contact or terminal 12 through the leaf spring 11, the wafer 8, the heat sink 7, the leaf springs 14a, 14b and the circlip 18 to the earth or ground connection.

The surface of the heat sink 7 facing the interior of the cylinder head 2 or the inlet 1 can be of such a cupped or textured shape that the fuel sprayed onto it takes up the heat better from the heat sink. The shape can also be selected in such a way that resulting depletion of the fuel and the air-fuel mixture flow is guided in the direction of the inlet valve 3.

Preferably the special position of the heating element, either in an opening in the wall of the cylinder head or in an opening in the wall of the air inlet channel is such that it is spaced from the junction 37 between the air inlet member and the cylinder head so that a seal is easily formed by a head gasket 38 as will be understood.

It should be understood that although particular embodiments of the invention are illustrated, the invention includes all modifications and equivalents of the disclosed embodiments falling within the scope of the appended claims.

We claim:

1. Injection internal combustion engine with electric spark ignition, comprising at least one cylinder provided with an air inlet channel, at least one inlet valve fitted in the cylinder head, at least one fuel injector, and a heating element with heat sink fitted downstream of said injector, and at least one PTC wafer provided thereon, characterized in that the heating element is fitted in an opening in the wall of the cylinder head to be flush with the wall to receive the fuel thereon.

2. Cylinder head intended for an internal combustion engine according to claim 1.

3. Heating element for heating the fuel/air mixture for an Otto internal combustion engine of the injection type, comprising a plastic contact carrier, a heat sink with at least two pins, and at least one PTC wafer fitted on the heat sink while a metal spring connected to an electric connecting element is fitted between the contact carrier and the PTC wafer, wherein each of said pins of the heat sink projects through an opening in the carrier, an opening in a metal leaf spring having parts bent away from the plastic contact carrier and through an opening in a U-shaped fixing bracket, which bracket falls round the contact carrier and round the above-mentioned leaf spring.

4. Heating device according to claim 3, characterized in that bent-out lips round the feed-through openings of the brackets engage on the pins in a clamping manner.

5. Injection internal combustion engine with electric spark ignition comprising at least one cylinder provided with an air inlet channel, at least one inlet valve fitted in the cylinder head, at least one fuel injector, and a heating element with heat sink fitted downstream of said injector, and at least one PTC wafer provided thereon, characterized in that the heating element is fitted in an opening in the wall of the cylinder head or of the air inlet channel and that the heat sink has at least two pins, each of which projects through an opening in a metal leaf spring with parts bent away from a plastic contact carrier and through an opening in a U-shaped fixing bracket, which brackets fall round the contact carrier and round the above-mentioned leaf spring and in that the heating device is retained in the opening of the wall of the cylinder head or of the air inlet channel by a circlip projecting into a groove in the wall, which circlip presses in the bent leaf spring part against spring action and presses the contact carrier against a shoulder in the wall of the opening.

6. An internal combination engine comprising a cylinder, a cylinder head mounting a cylinder inlet valve and having a passage leading to the valve, an air inlet member having a channel leading to the passage for furnishing air to the cylinder, a fuel injector mounted on the air inlet member for furnishing fuel to be mixed with air into the cylinder head passage, and a heating element having a heat sink and having a PTC heating tablet on the heat sink furnishing heat thereto, the heating element being disposed in an opening in the cylinder head recessed into the cylinder head to be flush with a wall of the air inlet channel to receive fuel from the fuel injector on the heat sink to be mixed with air being furnished to the cylinder through the channel and passage free of interference with flow of the air to the cylinder.

7. An internal combustion engine comprising a cylinder, a cylinder head mounting a cylinder inlet valve and having a passage leading to the valve, an air inlet member having a channel leading to the passage for furnishing air to the cylinder, a fuel injector furnishing fuel to be mixed with the air, and a heating element having a heat sink and having a PTC heating tablet on the heat sink furnishing heat thereto, the heat sink having a cup shape and having integral pins extending from a bottom of the heat sink cap over a rim of the heat sink cup, a base member of electrically insulating material has a cup shape, has the rim of the heat sink cup received therein, and has an opening in the bottom of the base cup receiving the heat sink pins thereon, the PTC heating tablet being disposed within the heat sink cup against the heat sink cup bottom, a spring terminal is held between the base cup and the PTC heating tablet in electrical engagement with the tablet, and retaining means engage the heat sink pins to retain the heating element in assembled relationship, the heating element being disposed in an opening recessed into one of the cylinder head and the air inlet member to receive fuel from the fuel injector on the heat sink to be mixed with air being furnished to the cylinder through the channel and passage free of interference with flow of the air to the cylinder.

8. An internal combustion engine comprising a cylinder, a cylinder head mounting a cylinder inlet valve and having a passage leading to the valve, an air inlet member having a channel leading to the passage for furnishing air to the cylinder, a fuel injector furnishing fuel to be mixed with the air, and a heating element having a heat sink and having a PTC heating tablet on the heat sink furnishing heat thereto, the heating element being disposed in an opening recessed into one of the cylinder head and the air inlet member, the opening extending through the cylinder head or inlet member and having a counterbore forming a shoulder and a ring gasket is disposed against the shoulder, the heating element is fitted within the gasket to press the gasket in sealing relation to the shoulder and to the heating element while disposing the heat sink at one end of the opening for receiving fuel thereon from the fuel injector, and a clip means is fitted at the opposite end of the opening to hold the heating element within the opening, the heating element receiving fuel from the fuel injector on the heat sink to be mixed with air being furnished to the cylinder through the channel and passage free of interference with flow of the air to the cylinder.

9. An internal combustion engine according to claim 8 wherein the clip means comprises a resilient C-clip fitted into a groove in the opening, and a spring washer resting on the C-clip presses the heating element into sealing relation with the gasket.

10. An internal combustion engine according to claim 9 wherein the spring terminal comprises a multifingered spring resiliently engaging the PTC tablet holding the tablet against the heat sink and a terminal blade secured at one end to the spring and extending through the electrically insulating base member to be connected in a circuit.

11. An internal combustion engine comprising a cylinder, a cylinder head mounting a cylinder inlet valve and having a passage leading to the valve, an air inlet member having a channel leading to the passage for furnishing air to the cylinder, a fuel injector furnishing fuel to be mixed with the air, and a heating element disposed in an opening recessed into one of the cylinder head and the inlet member to receive fuel from the fuel injector to be mixed with air being furnished to the cylinder through the channel and passage free of interference with flow of the air to the cylinder, the heating element including a heat sink having a cup shape and having integral pins extending from a bottom of the heat sink cup over a rim of the heat sink cup, a base member of electrically insulating material having a cup shape has the rim of the heat sink cup received therein and has openings in a bottom of the base cup receiving the heat sink pins therein, a PTC heating tablet is disposed within the heat sink cup against the heat sink bottom for heating the heat sink, a spring terminal is held between the base cup and the PTC heating tablet, retaining means engage the heat sink pins to retain the heating element in assembled relation, the opening has a counterbore forming a shoulder, an O-ring gasket is disposed against the shoulder, the heating element is fitted within the gasket to press the gasket in sealing relation to the shoulder and to the heating element while disposing the heat sink for receiving fuel thereon from the fuel injector to be heated and mixed with the air, and a clip means is fitted into the opening to hold the heating element within the opening.

12. An internal combustion engine according to claim 11 wherein the clip means comprises a resilient C-clip fitted with a groove in the opening, and spring a washer resting on the C-clip presses the heating element into sealing relation with the gasket.

13. An internal combustion engine according to claim 7 wherein the spring terminal comprises a multifingered spring resiliently engaging the PTC tablet holding the tablet against the heat sink, and a terminal blade secured at one end to the spring and extending through the electrically insulating base member to be connected to a circuit.

* * * * *